Nov. 27, 1928.
G. E. LAMBERT
WIRE ROPE CLAMP
Filed Feb. 8, 1928
1,692,993
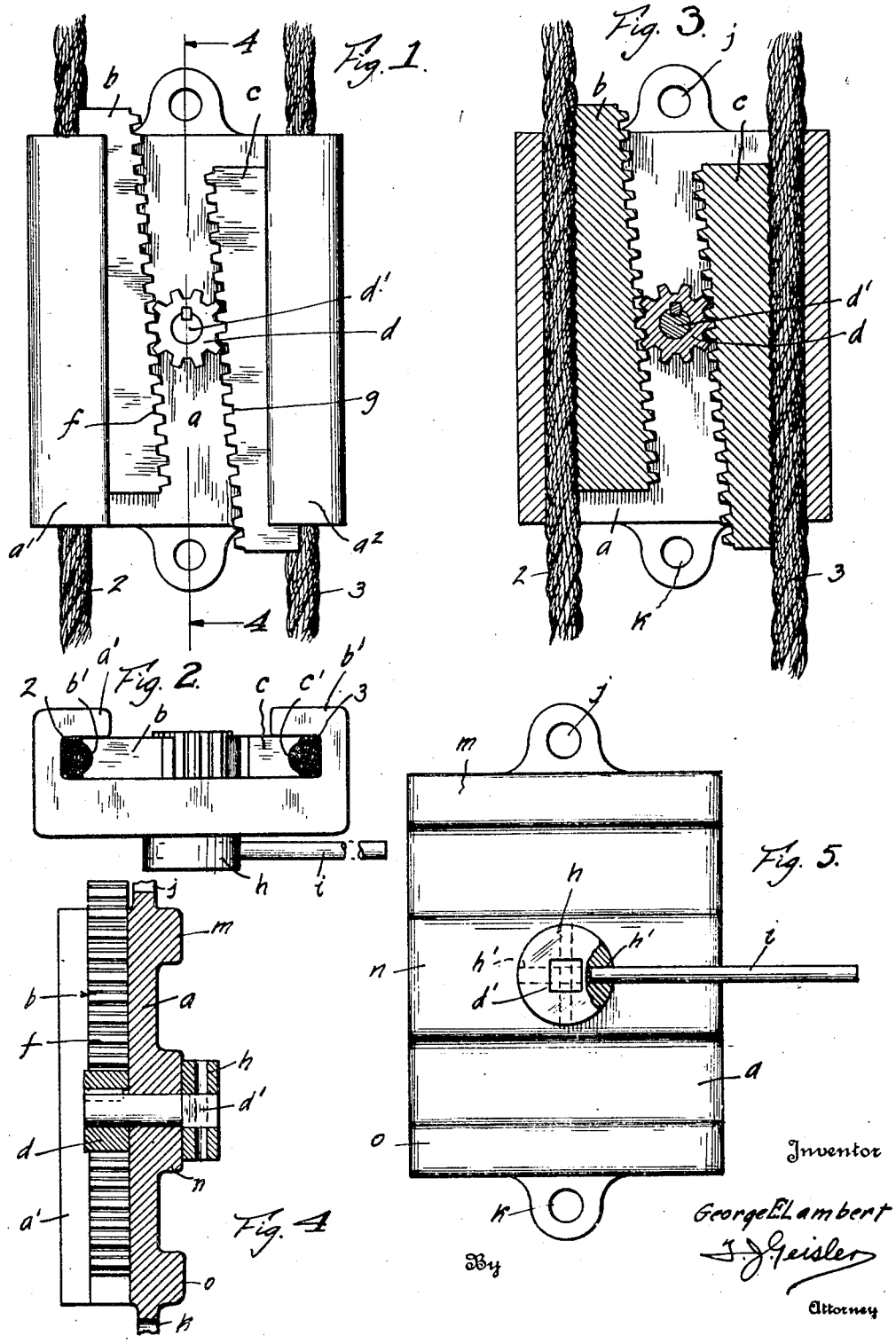

Patented Nov. 27, 1928.

1,692,993

UNITED STATES PATENT OFFICE.

GEORGE E. LAMBERT, OF SALEM, OREGON, ASSIGNOR OF ONE-FOURTH TO JAMES W. DUFF, OF PORTLAND, OREGON.

WIRE-ROPE CLAMP.

Application filed February 8, 1928. Serial No. 252,794.

My invention relates to cable clamps, particularly to wire-rope clamps adapted for use in logging operations.

The principal object of my invention is to provide a wire-rope or cable clamp, adapted to a variety of purposes especially in logging operations; and which may be easily and conveniently applied or removed, and which will tend to hold the wire rope sections more tightly, the greater the strain imposed.

My further object is to provide a cable clamp capable of sustaining heavy duty. To attain this feature my cable clamp comprises a plate formed with companion opposed clamping guideways adapted to receive sections of cable; rack-like wedge bars slidable in these guideways, and a pinion centrally arranged between the said wedge bars, meshing with the teeth thereof.

Thus by rotating the pinion, the wedge bars are moved oppositely and caused to engage the cable sections; and the harder the pull on the cable ends, the greater will be the grip of my clamp thereon. And this arrangement further prevents any bending strain being imposed on the journal pin of the pinion; but instead the pressure of the pressure bars on opposite sides thereof will impose merely a compression strain.

Further my invention will not become loosened under the jerks and uneven strains to which it is subjected. For example, when the "haul back" line is run out into the woods and passed over a block, the block is usually fastened to a stump or tree by a section of wire rope looped about the stump and passed through the eye of the block. The ends of wire rope section are then fastened together by hooks or other similar devices, which tend to come loose under the thrashing and jerking of the haul back line as a log is hauled into the skidway.

Also in "high line" logging operations the guy lines and other lines are more or less temporarily fastened at each end by similar devices, which are expensive and require the ends of the wire rope to be especially fitted with eyes or clevises.

Therefore another object of my invention is to provide a wire rope clamp that can be applied under any conditions, on a section of wire rope, without any auxiliary fittings such as heretofore mentioned.

A still further object of my invention is to provide a wire rope clamp, simple of construction and operation and economical of manufacture.

Further details of construction and the mode of operation of my invention will hereinafter be described in detail with reference to the accompanying drawings, in which:

Fig. 1 shows a top plan view of my wire rope clamp and a section of wire rope clamped therein;

Fig. 2 shows an end view of my cable clamp as shown in Fig. 1;

Fig. 3 shows a section taken on the line 3—3 of Fig. 2, looking in the direction of the arrows and illustrates the details of construction;

Fig. 4 shows a section taken on the line 4—4 of Fig. 1 and illustrates further details of construction;

Fig. 5 shows a plan view of my invention, looking at the opposite side from that shown in Fig. 1.

My invention comprises a plate $a$ provided with opposed companion guideways $a'$ and $a^2$ on the opposite edges adapted to receive cable sections 2 and 3.

Two companion wedge bars $b$ and $c$ are arranged between the guideways $a'$ and $a^2$ and extend into the space partially enclosed by the said guideways and are adapted to bear against the respective wire rope sections 2 and 3.

The wedge bars $b$ and $c$ are constructed with their outer edges parallel with the guideways, and with longitudinal grooves $b'$ and $c'$, adapted to fit over the wire rope sections, and grip them securely.

The inner edges $f$ and $g$ of the wedge bars are provided with rack-like teeth and taper somewhat towards one end and are arranged with their thicker ends at the opposite ends of the plate $a$, respectively, Figures 1 and 2.

A pinion $d$ is centrally arranged on the plate $a$ and meshes with the toothed edges $f$ and $g$. The pinion $d$ is fixed on a stub shaft, $d'$ which extends through the plate $a$ and is provided on its other end with a collar $h$, provided with a number of holes $h'$ in which an operating handle $i$ may be inserted.

By this construction, the wire rope which has been looped about a stump or similar anchor will be inserted under the guideways $a'$ and the free end of the rope section will be inserted under the guideway $a^2$ and the pinion $d$ will be rotated by the pin $i$ which will move the wedge bars *b* and *c* in opposite directions and exert a clamping force on the wire rope sections due to their wedge-like shape, which movement will also be the directions of the strain on the wire rope sections.

Further, since the strains on the wire rope sections are in the direction of the clamping action of the wedge bars, the said strain will tend to draw the wedge bars more tightly against the wire rope sections, the greater the strain and the strain on the stub shaft *d'* being equal on both sides will be one of compression only which will not tend to lock the pinion *d* or deform the stub shaft *d'* as would be the case if the strain on each side were not equal.

Eyes *j* and *k* are provided at each end of the plate *a* for convenience in handling, and the plate *a* is also provided with transverse bosses *m*, *n* and *o*, on its rear side which serve to strengthen the said plate.

I claim:

1. A cable clamp, a plate formed at its opposite lateral edges with companion clamping guide clamps adapted to receive sections of cable therein, a wedge bar slidable in each guide flange and accommodating said cable section, the free edge of the wedge bar provided with ratchet teeth, and a rack pinion journaled on said plate between and engaging said wedge bars.

2. A cable clamp, a plate formed at its opposite lateral edges with companion clamping guide clamps adapted to receive sections of cable therein, a wedge bar slidable in each guide flange and accommodating said cable section, the free edge of the wedge bar provided with ratchet teeth, a rack pinion journaled on said plate between and engaging said wedge bars, and means for rotating said rack pinion thereby to move the wedge bars in opposite directions and bring them in engagement with the cable placed in said clamping flange whereby the pull on the cable will cause the wedge bars to move therewith with increasing clamping action.

3. A cable clamp, a plate formed at its opposite lateral edges with companion clamping guide clamps adapted to receive sections of cable therein, a wedge bar slidable in each guide flange and accommodating said cable section, the free edge of the wedge bar provided with ratchet teeth, the inner edges of said wedge bars being concave, a rack pinion journaled on said plate between and engaging said wedge bars, and means for rotating said rack pinion thereby to move the wedge bars in opposite directions and bring them in engagement with the cable placed in said clamping flange whereby the pull on the cable will cause the wedge bars to move therewith with increasing clamping action.

4. A cable clamp, a plate formed at its opposite lateral edges with companion clamping guide clamps adapted to receive sections of the cable therein, a wedge bar slidable in each guide flange and accommodating said cable section, the free edge of the wedge bar provided with ratchet teeth, the inner edges of said wedge bars being concave, said plate provided with a central boss, a shaft journaled in said boss, and a rack pinion fixed on one end of said shaft between and engaging said wedge bar, a member fixed on the opposite side of said shaft on the back of the said plate, said member provided with sockets to receive an operating lever.

5. A cable clamp, a plate formed at its opposite lateral edges with companion clamping guide clamps adapted to receive sections of cable therein, the opposite ends of the plate provided with ears, a wedge bar slidable in each guide flange and accommodating said cable section, the free edge of the wedge bar provided with ratchet teeth, the inner edges of said wedge bars being concave, and said plate provided with transverse stiffening ribs on its rear side and a central boss, a shaft journaled in said boss, and a rack pinion fixed on one end of said shaft between and engaging said wedge bar, a member fixed on the opposite side of said shaft on the back of the said plate, said member provided with sockets to receive an operating lever.

6. A cable clamp, a plate formed at its opposite lateral edges with companion clamping guide clamps adapted to receive sections of cable therein, the opposite ends of the plate provided with ears, said plate provided with transverse stiffening bosses on its rear side, a wedge bar slidable in each guide flange and accommodating said cable section, the free edge of the wedge bar provided with ratchet teeth, the inner edges of said wedge bars being concave, a rack pinion journaled on said plate between and engaging said wedge bars, and means for rotating said rack pinion thereby to move the wedge bars in opposite directions and bring them in engagement with the cable placed in said clamping flange whereby the pull on the cable will cause the wedge bars to move therewith with increasing clamping action.

GEORGE E. LAMBERT.